United States Patent [19]

Beunéche et al.

[11] Patent Number: 4,659,537
[45] Date of Patent: Apr. 21, 1987

[54] APPARATUS FOR MAINTENANCE OF NUCLEAR FUEL ASSEMBLIES

[75] Inventors: Daniel Beunéche, Collonges Au Mont D'Or; Pierre Amiet, Condrieu, both of France

[73] Assignee: Framatone et Cogema, Paris, France

[21] Appl. No.: 552,559

[22] Filed: Nov. 16, 1983

[30] Foreign Application Priority Data

Nov. 16, 1982 [FR] France .................... 82 19162

[51] Int. Cl.$^4$ ............................................. G21C 19/00
[52] U.S. Cl. .................................... 376/261; 29/426.1
[58] Field of Search .................... 376/261, 262; 29/402.01, 402.03, 402.04, 402.08, 402.11, 402.19, 426.1, 426.2, 426.3, 426.4, 426.5

[56] References Cited

U.S. PATENT DOCUMENTS 3,887,980  6/1975  Yates et al. ................ 376/261
4,511,531  4/1985  Swidwa et al. ............. 376/262

OTHER PUBLICATIONS

A Vertical Assembler–Dismantler for the Fuel Cycle Facility, Proceedings of the 17th Conference on Remote Systems Technology, 1969, pp. 26–33.

Primary Examiner—Deborah L. Kyle
Assistant Examiner—Richard W. Wendtland
Attorney, Agent, or Firm—Pollock, Vande Sande & Priddy

[57] ABSTRACT

The apparatus is for dismounting nuclear fuel assemblies comprising a skeleton having an upper end piece, a lower end piece, guide tubes connecting the end pieces and fuel rods maintained by grids between the end pieces. The apparatus comprises a cell displaceable vertically in a water tank and provided, at its upper part, with a base plate having an opening for passage of one said fuel assembly and provided with means for gripping an upper part of the bundle of fuel rods. A centering unit is operable by a handling tool and is arranged for gripping the upper end piece of a fuel assembly. The guide tubes may be disconnected from the upper end piece while the bundle of fuel rods is retained in the cell.

16 Claims, 35 Drawing Figures

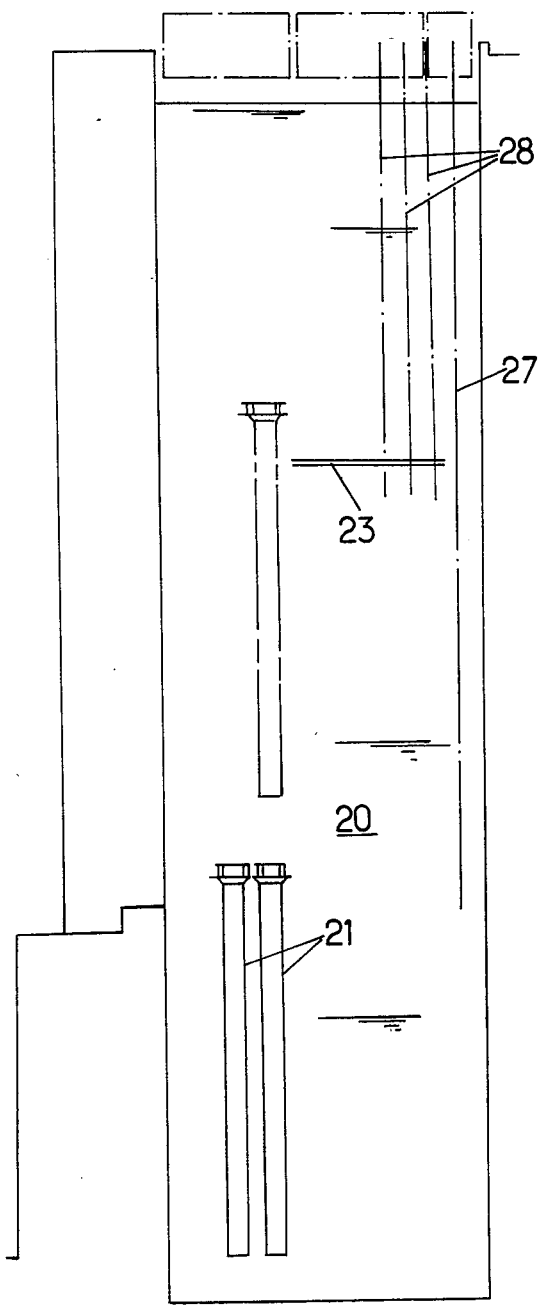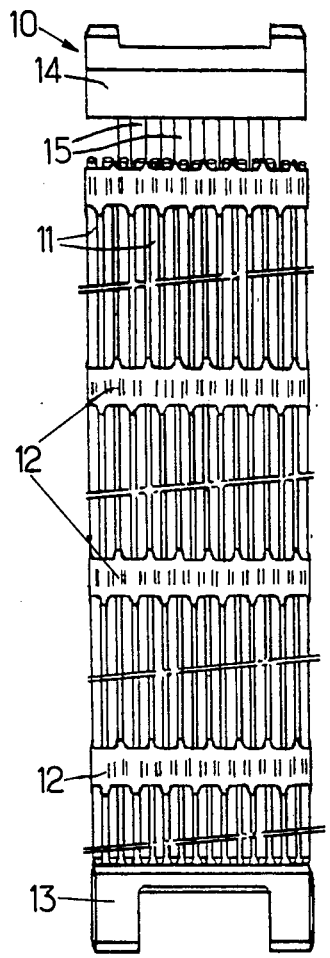

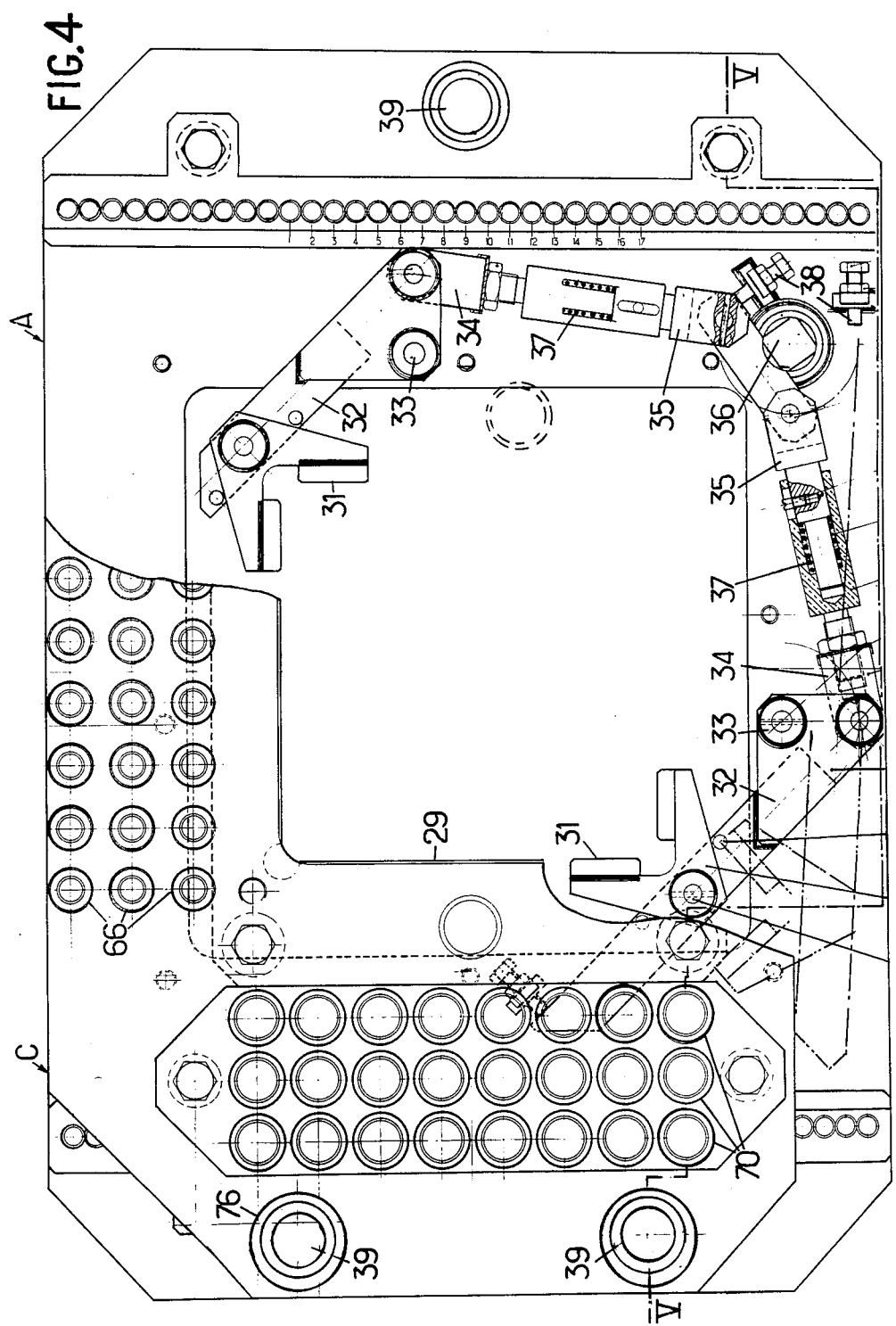

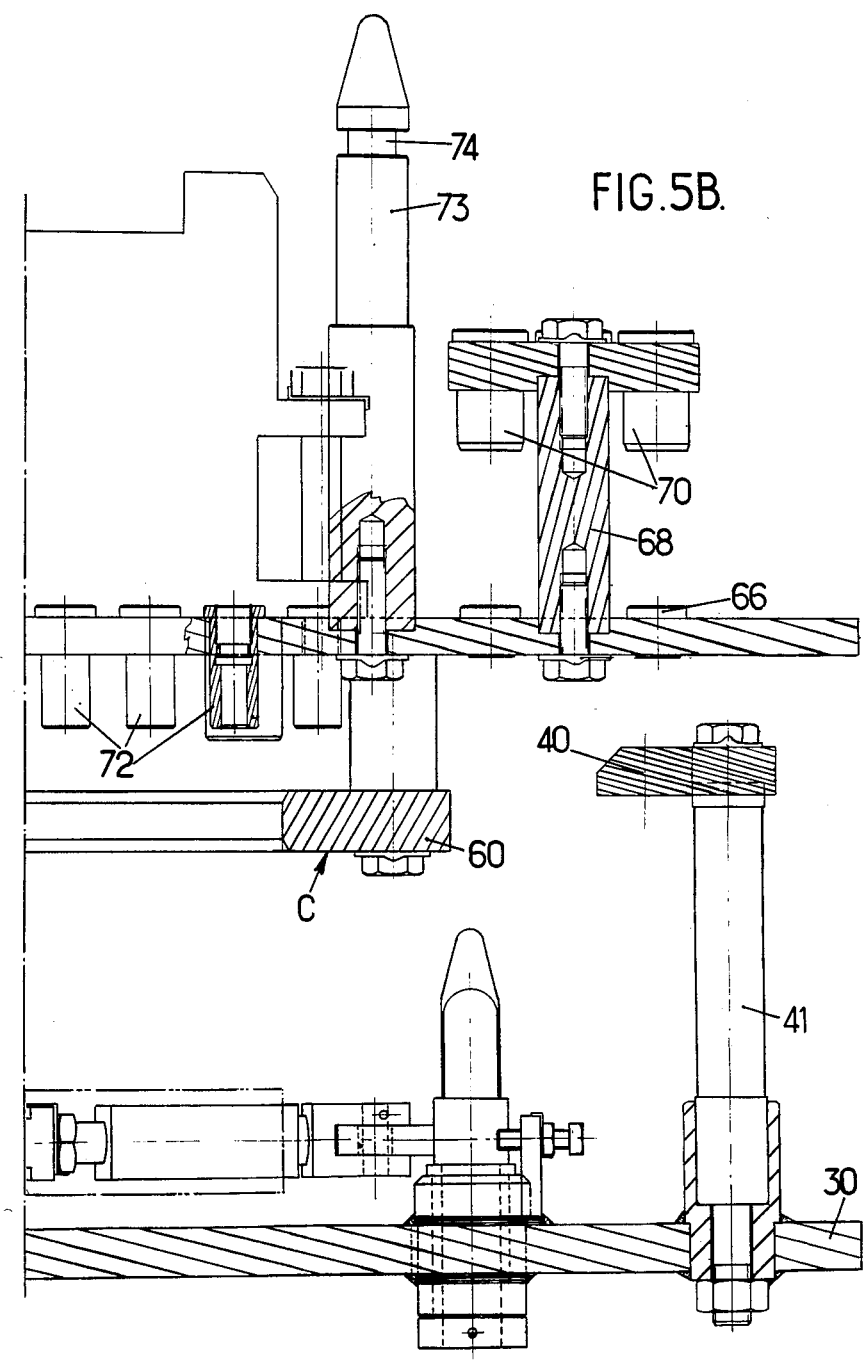

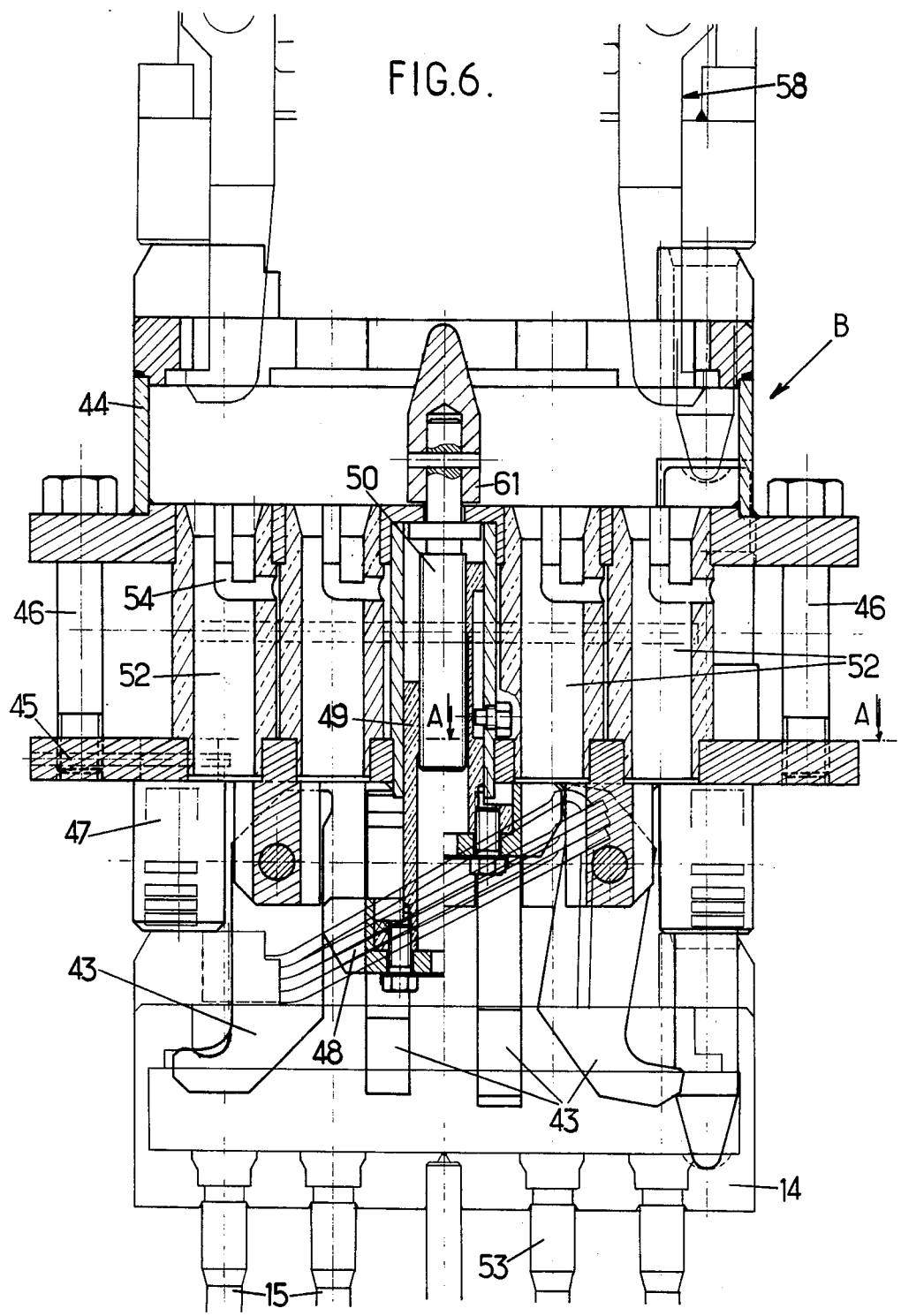

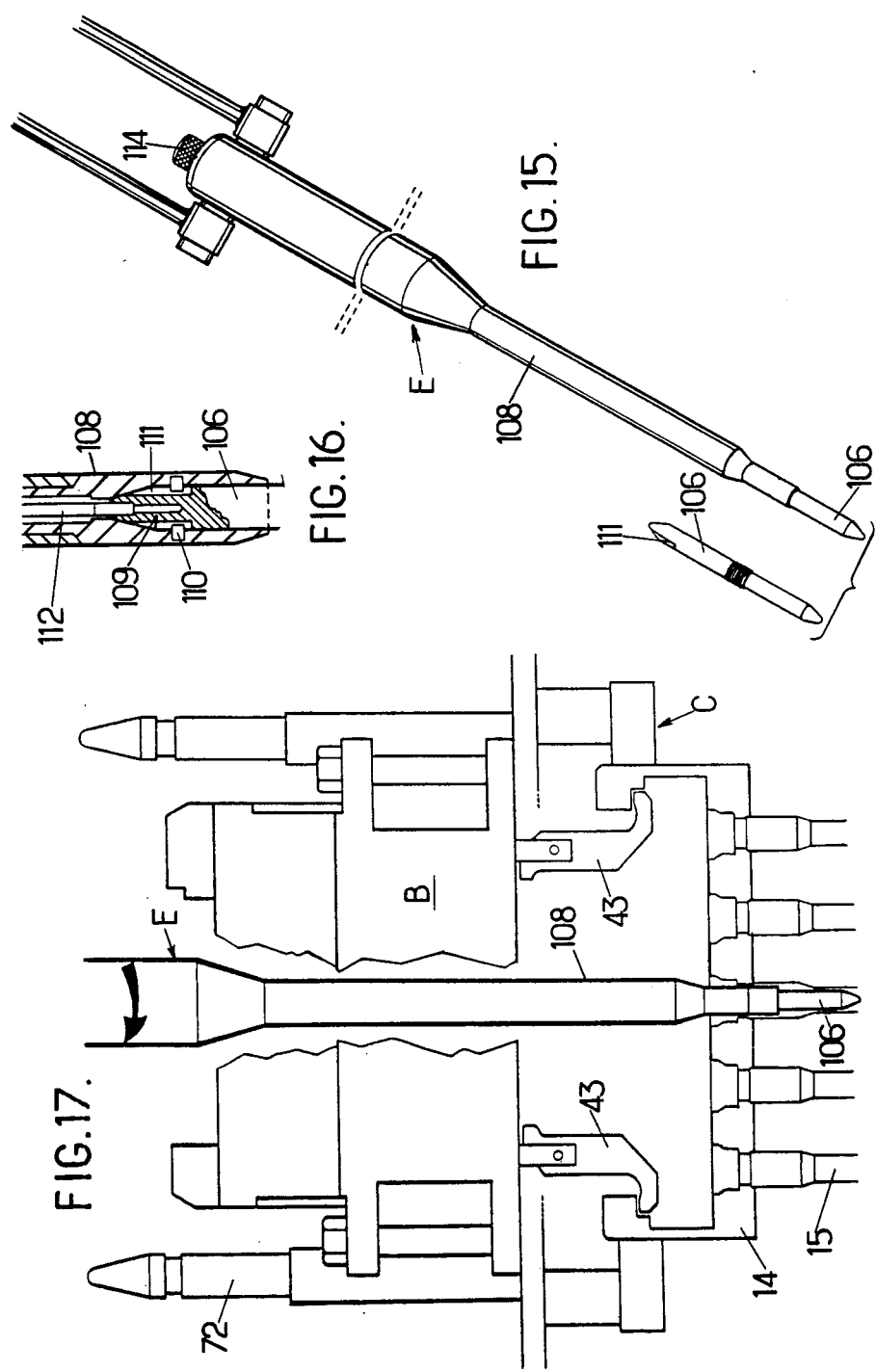

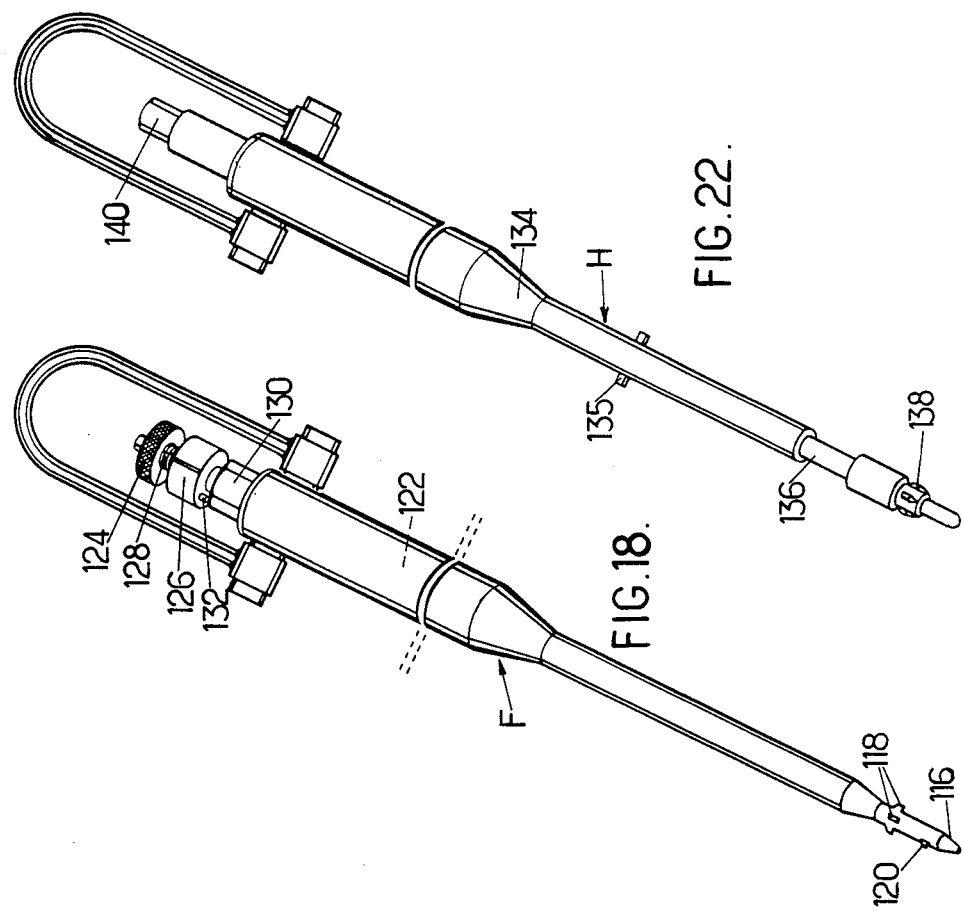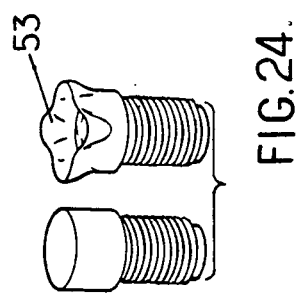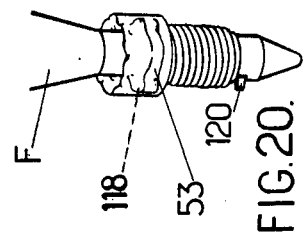

APPARATUS FOR MAINTENANCE OF NUCLEAR FUEL ASSEMBLIES

BACKGROUND AND SUMMARY OF THE INVENTION

The present invention relates to maintenance of nuclear fuel assemblies comprising a skeleton formed of two end-pieces or nozzles connected by tie members fixed removably to at least the upper end-piece and grids distributed between the end-pieces and intended to hold a bundle of fuel rods confined between the end-pieces. Reference may be had to French Patent Publication No. 2,368,785 for an example of fuel assemblies of this type.

Manipulation of such an assembly presents no difficulties when it is new, but this is not the case when it has been in a reactor and so is highly radioactive. In order to avoid having to discard an assembly which has one or more defective rods after it has resided in a reactor and so is radioactive requiring manipulation from a distance under water, there have already been suggested apparatuses allowing maintenance of the assembly by replacement of one or more rods. However, the apparatuses suggested up to now, as disclosed for instance in French Patent Publication No. 2,360,963, require tilting through 180° of the assembly before removing the lower end piece. This approach to the problem, based on the fact that the lower end-piece appears better adapted than the upper end-piece to removal and remounting, leads to apparatus which is extremely bulky and requires rotating of a container of very great length.

It is an object of the invention to provide apparatus allowing maintenance of a fuel assembly without requiring of the latter displacements other than horizontal and vertical rectilinear movements, while guaranteeing precise and reliable mounting in place of the components on reassembly.

For this purpose, there is provided an apparatus comprising a cell displaceable vertically in a pit where it is stored under water. The cell is provided, at its upper part, with a base plate having an opening for passage of a fuel assembly and provided with means for gripping the upper part of the fuel assembly, generally at the level of the upper grid of the latter, a guiding or centering member arranged to be manipulated by a handling tool, intended to cover the upper end-piece of the fuel assembly and to lock on to it, and means for detaching the tie members from the upper end-piece.

The invention will be better understood from the following description of apparatus which constitutes a particular embodiment, given by way of example.

SHORT DESCRIPTION OF THE DRAWINGS

FIG. 1 is a schematic diagram showing the general arrangement of a fuel assembly capable of being maintained by means of apparatus according to the invention;

FIG. 2 is a diagram in elevation showing the arrangement of cells for receiving the fuel assembly belonging to the apparatus in a tank;

FIG. 4 is a view from above, with some parts removed, showing the base plate and gripping means with which the cell is equipped;

FIGS. 5A and 5B are left-hand and right-hand sections along line V—V of FIG. 4, showing also a frame for securing the upper end-piece in place thereon;

FIG. 6 is a sectional view on a vertical plane passing through the axis of the fuel assembly being manipulated, showing a member for centering and guiding in place on the frame for securing the upper end-piece and a cylinder-carrying plate;

FIG. 15 is a view in perspective showing a handling tool for centering cones and one of these cones separated from the tool;

FIG. 16 is a view in section on a larger scale of the end part of the tool of FIG. 15, provided with a cone;

FIG. 17 is a diagram in elevation, showing the mounting in place of a centering cone in a guide tube;

FIG. 18 is a view in perspective of a tool for dismounting and unlocking the connectors joining the guide tubes to the upper end-piece;

FIG. 20 is a diagram on a large scale, in perspective, showing removal of a connector after unscrewing using the tool of FIG. 18;

FIG. 22 is a perspective view showing a tool for deforming the connectors for fixing the tie member, allowing the latter to be secure;

FIG. 24 shows a connector before and after deformation;

DETAILED DESCRIPTION OF PREFERRED EMBODIMENTS

Figure 3:
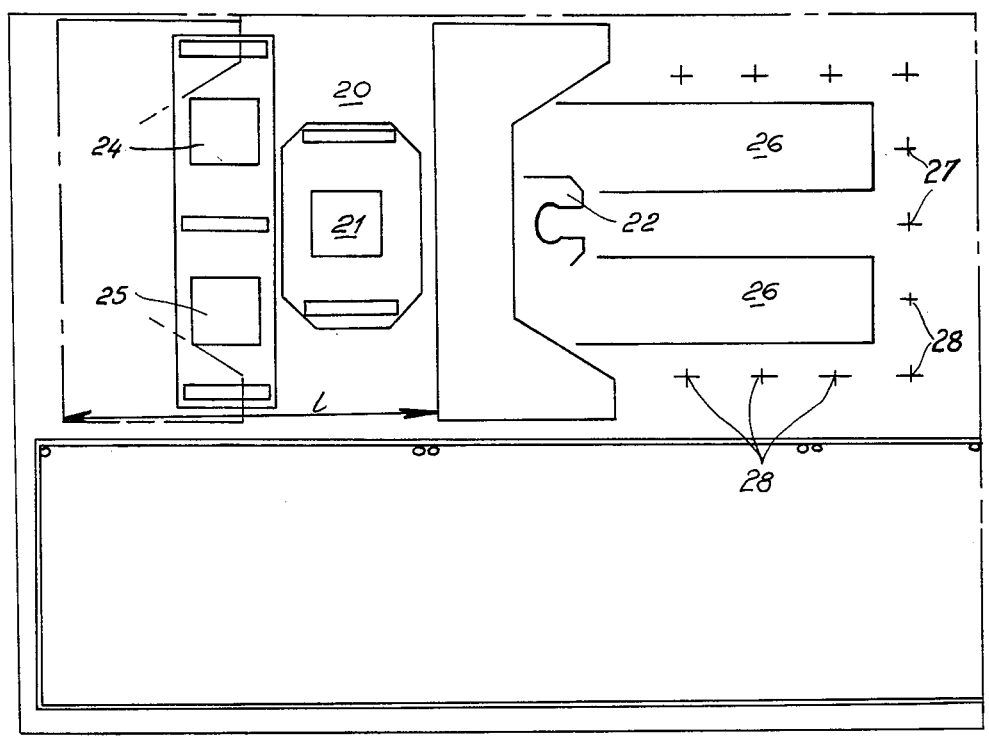
FIG. 3 is a diagram showing together the apparatus and associated elements, viewed from above.

Before describing an apparatus according to the invention, there will first be described briefly the structure of a fuel assembly to which it may be applied. This assembly 10, shown in FIG. 1, comprises a bundle of fuel rods 11 held by spacer grids 12 arranged along the bundle. The grids 12 provide passages of which the majority are traversed by fuel rods, whereas the others are traversed by tie members 15 fixed to a lower end-piece 13 and an upper end-piece 14 having at its upper part a shape allowing it to be grasped by a handling tool. The tie members 15 are fixed to the upper end-piece 14 by dismantlable means formed by socket connectors (not shown in FIG. 1) having a threaded lower part intended to be screwed into the upper part of a tie member and a head for abutment on the end-piece 14.

The apparatus is intended to allow dismantling, maintenance and re-assembly of a fuel assembly while the latter is immersed in water at a sufficient depth to provide biological protection. In practice the apparatus will in general be mounted in the pit of a tank for removal of spent fuel from a nuclear reactor. In the embodiment shown in FIGS. 2 and 3 the apparatus, placed in a tank 20, comprises at least one cell 21 formed by a receptacle of elongated parallelepipedal shape open at its upper end, hanging on a support 23 resting on the bottom of the tank. This support is provided with means allowing the cell to be displaced vertically between a lower position (in solid lines in FIG. 2) and an upper position (in the broken lines), separated from the former by several metres. Above the tank is provided a movable bridge which may be moved over distance l (FIG. 3) allowing displacement of a carriage 22 provided with a tool-carrier in two perpendicular directions. The support 23 is also provided with receptacles 24 and 25 respectively intended for new rods and damaged rods removed from the assembly. Finally, the support 23 is provided with various surfaces for storage of tools and positions intended to receive the different tools, which may be classified as short tools 28 (for use on the assembly when the cell is in its upper position) and long tools 27 (such as the tool used for extraction of a rod).

Figure 9:
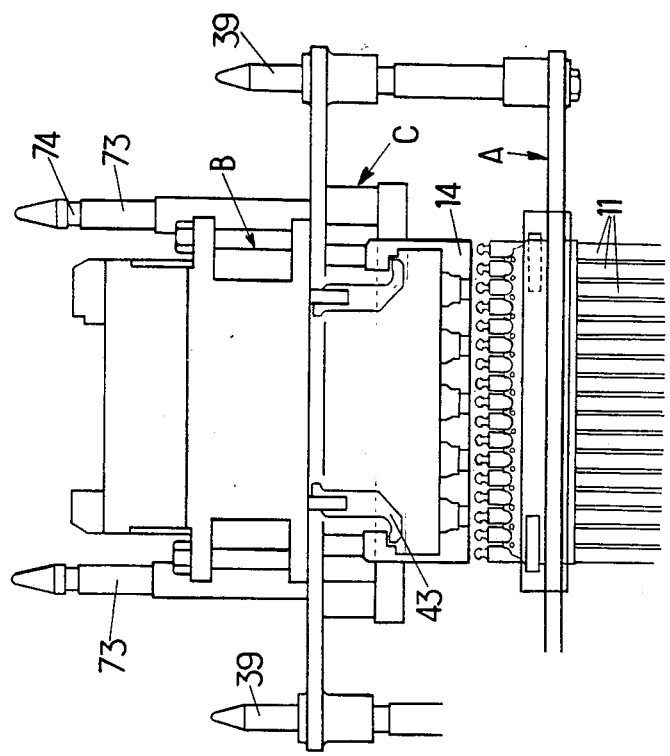
FIG. 9 is a diagram showing the respective arrangement of the fuel assembly, the base plate and the assembly formed by the frame, the cylinder-carrying plate and the centering member, after mounting in place of this assembly.
Figure 7:
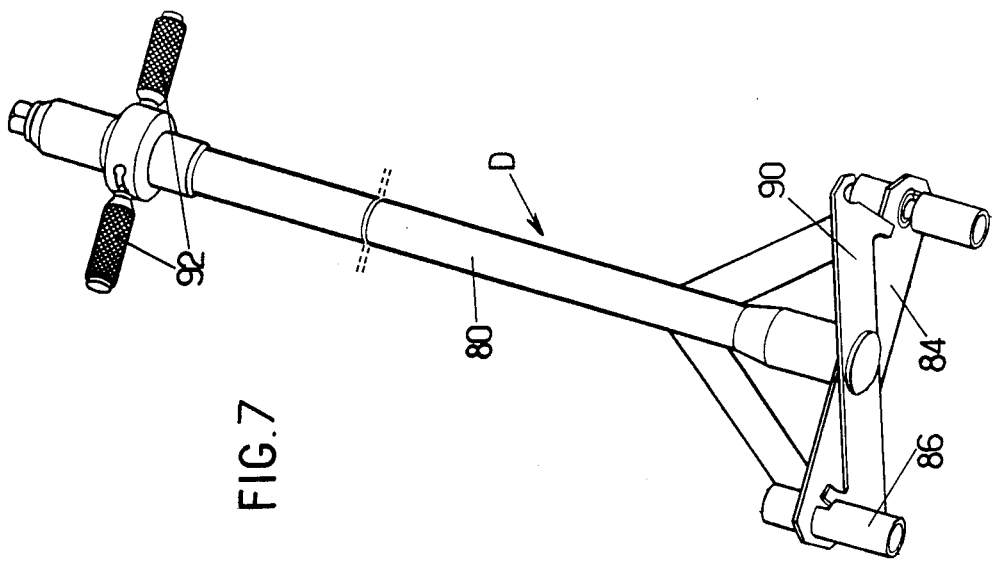
FIG. 7 is a diagram in perspective showing a tool for operating the centering member.
Figure 8:
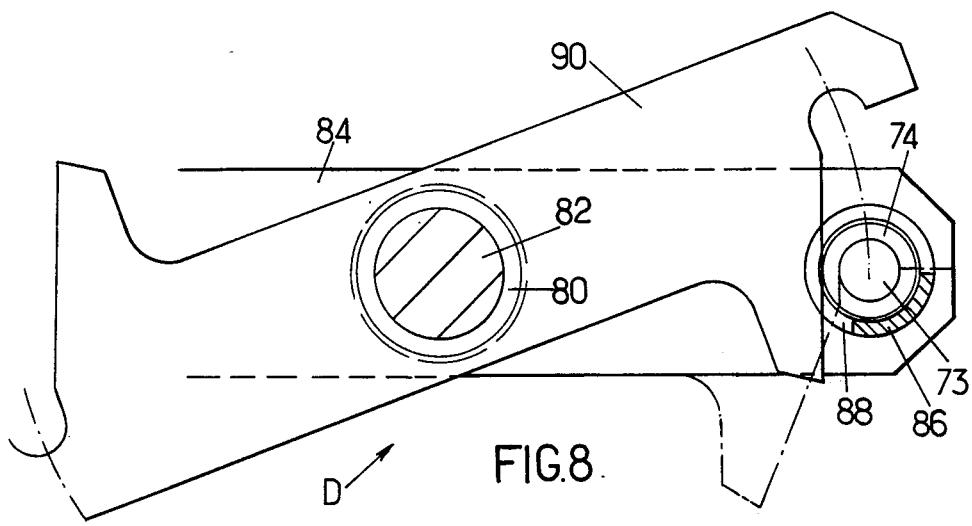
FIG. 8 is a view of a detail of the tool of FIG. 7 in section on a horizontal plane, showing the manner of locking of the tool on the centering member.
Figure 13:
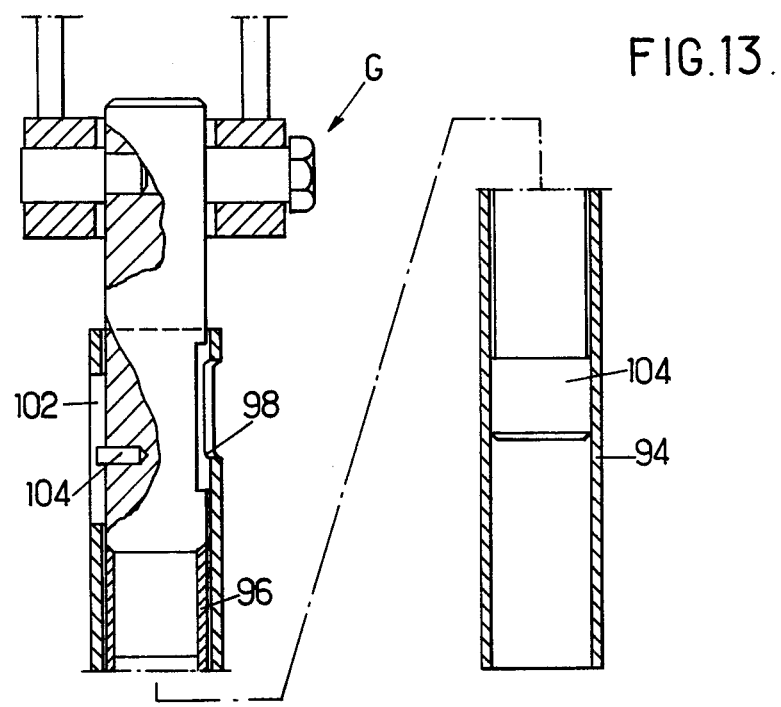
FIG. 13 shows the end parts of the tool of FIG. 12, in section on a plane passing along its axis.
Figure 12:
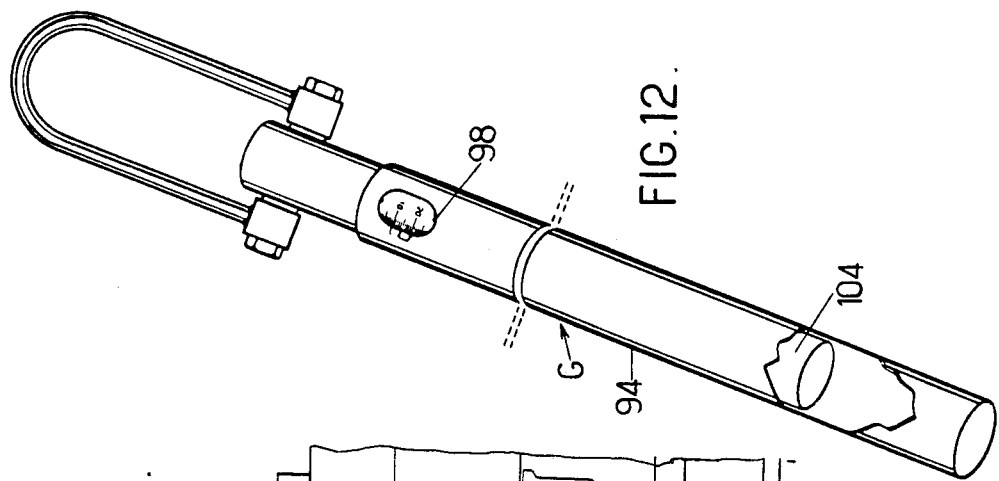
FIG. 12 is a diagram in perspective showing a checking tool forming a gauge.
Figure 14:
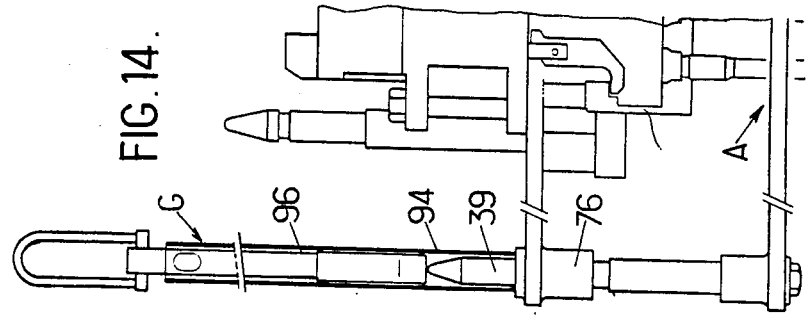
FIG. 14 is a diagram in elevation showing the use of the tool of FIGS. 12 and 13 on the centering member.
Figure 21:
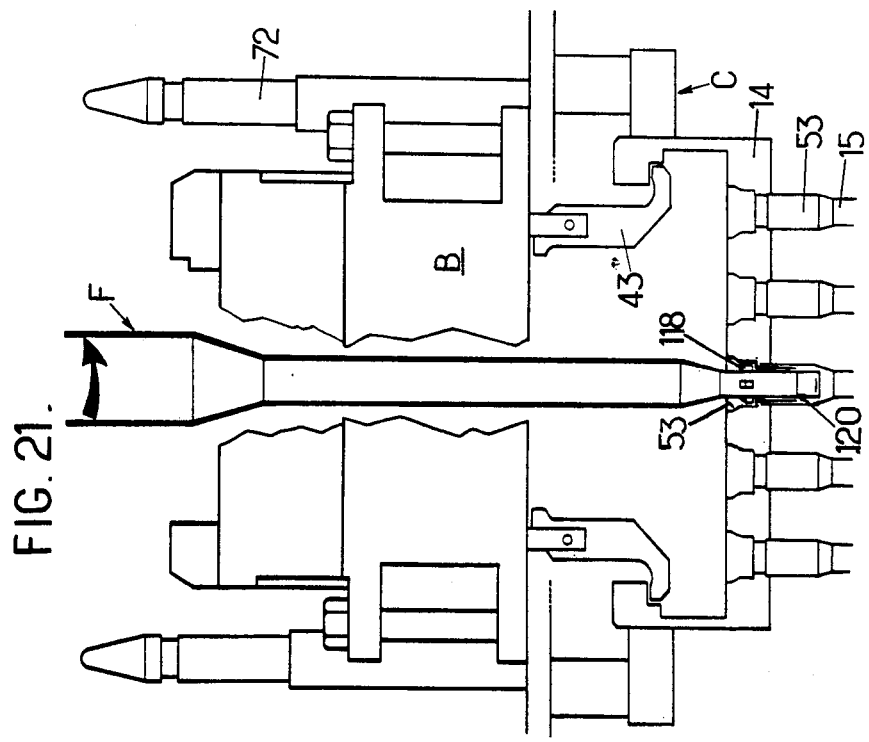
FIG. 21 is a schematic diagram showing, the tool of FIG. 18 in place on a connector in the fuel assembly.
Figure 23:
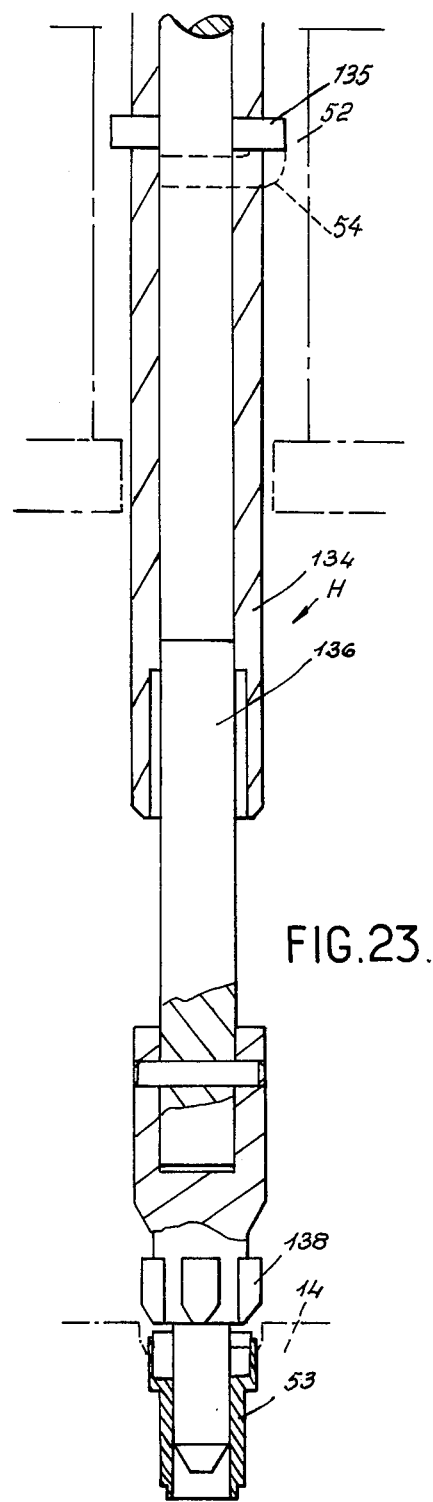
FIG. 23 is a schematic diagram showing, in elevation, the operation of deforming a connector.
Figure 19:
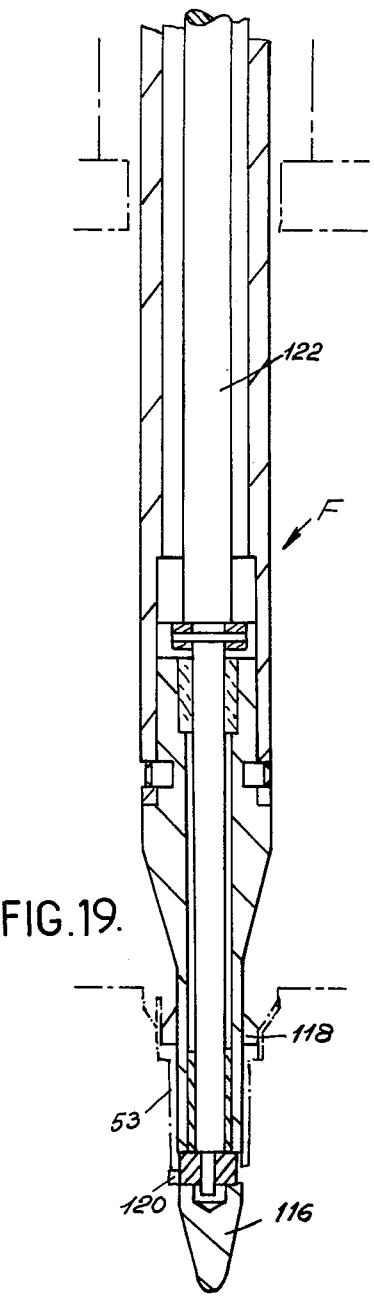
FIG. 19 shows the end part of the tool of FIG. 18, on a large scale, and in section on a plane passing through the axis.
Figure 25:
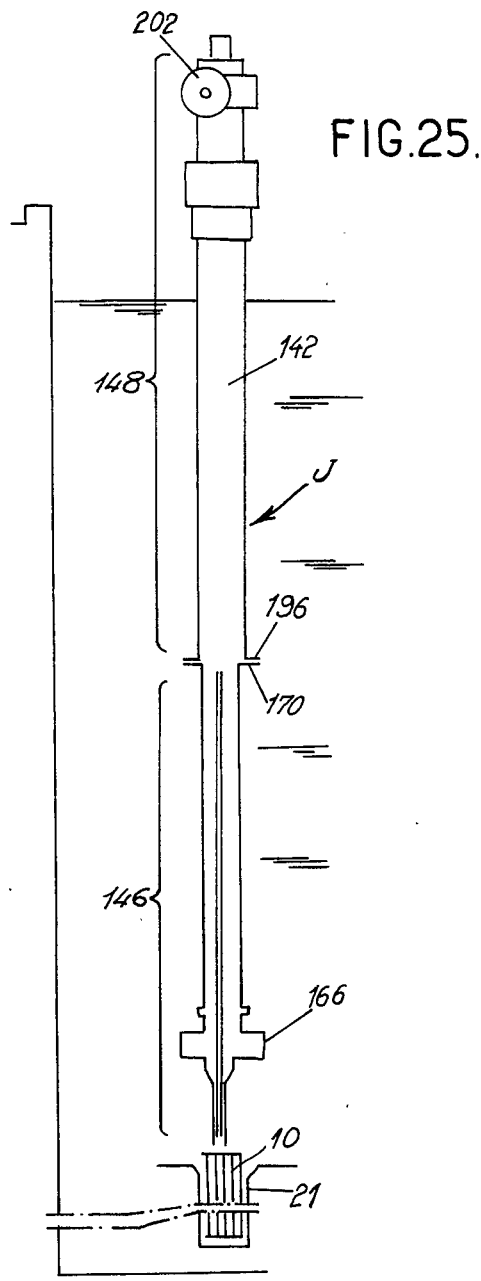
FIG. 25 is a schematic diagram showing, in elevation, the relative arrangement of a tool for extracting and inserting a fuel rod and a fuel assembly before engagement with the tool.

This will now be described, in succession, the most important active components of the apparatus, which are;

a base plate A carried by the upper part of the cell 21 and provided with means for centering the fuel assembly to be handled in this cell 21 (FIGS. 4 and 5);

a centering member B, shown especially in FIGS. 6 and 9, intended to be fixed on the upper end-piece of the fuel assembly by means of a tool;

an assembly C comprising a frame intended to limit rotation of the upper end-piece of the assembly during unscrewing of the connectors of the tie members, and a cylinder-carrying plate integral therewith;

and the carrying tools, comprising:

a tool D for engaging the centering member (FIGS. 7 and 8);

a tool E for mounting in place and removing the centering cones (FIGS. 15-17);

a tool F for slackening and unscrewing the connectors (FIGS. 18-21);

a tool G comprising a gauge for checking the position of the centering member (FIGS. 12-14);

a tool H for deforming a connector (FIGS. 22-24);

a tool J for handling a rod (FIGS. 25-33).

The head plate A, shown in FIGS. 4 and 5 comprises a base plate 30 in which is provided an opening 29 sufficiently large to allow passage of the fuel assembly when the latter is brought above the cell situated in its lower position, and then lowered using a clamp which may also be used for gripping and moving the guiding member B (FIG. 6). The base plate 30 carries means for gripping the assembly at the level of its upper grid 12, allowing the assembly to be held in position during and after removal of the upper end-piece. This means comprises two articulated arms for separating and bringing together two members 31 and tightening or freeing two opposite corners of the assembly. These articulated arms comprise, starting from each member 31, a lever 32 rotating on axis 33. The end of the lever opposite that which carries the member 31 is connected by a push rod provided with end caps 34, 35 to a bar driven by a square head 36. Each of the push rods is in two parts one sliding in the other, transmission of force taking place through a compression spring 37, the two springs having slightly different ratings (for example 30 daN for one, 25 daN for the other). Two adjustable abutments, formed by screws 38, limit the rotation of the square head 36 on either side to the contact position of the articulated arms, in which they are shown in solid lines in FIG. 4. The base plate 14 also carries various means cooperating with other elements which will be described below. In particular, it carries three columns 39 intended to ensure precise positioning of the frame of assembly C which will be described below. The base plate also carries four spacers 41 intended to hold, on either side of the head of the cell 21, two members 40 each comprising a line of holes intended to receive locating pins carried by the lower frame of tool J for handling the rods, as will be seen below.

Figure 10:
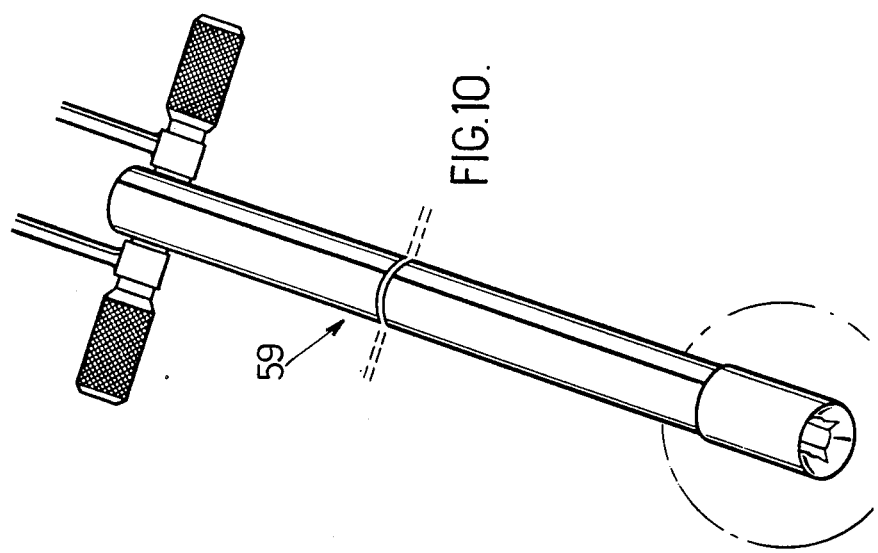
FIG. 10 is a perspective diagram of a tool for securing the guiding member on the upper end-piece.
Figure 11:
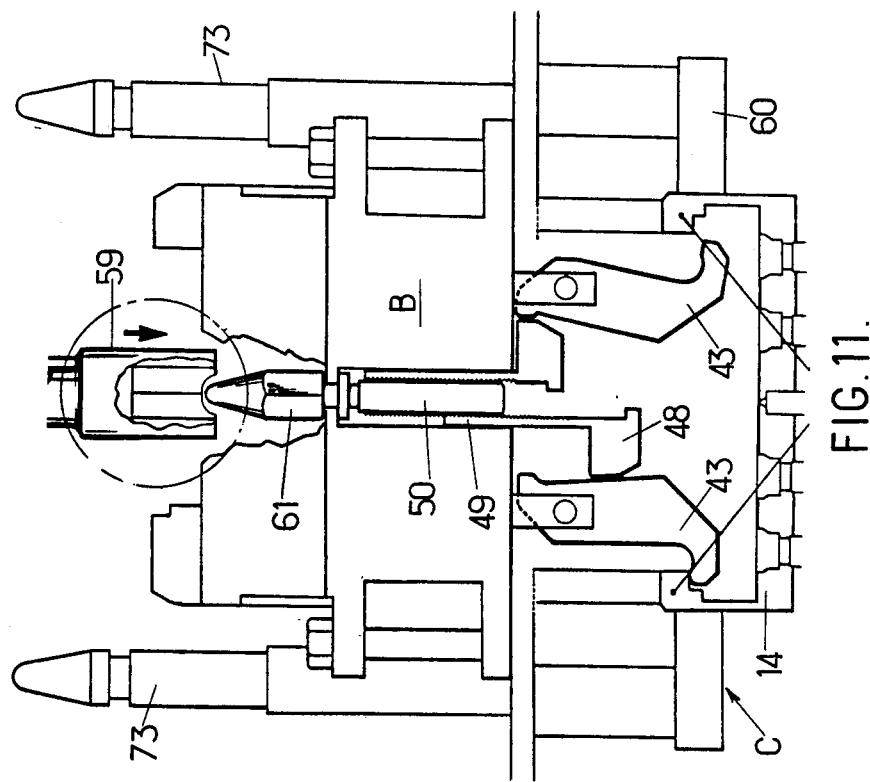
FIG. 11 is a diagram in elevation showing the method of securing the guide member, by means of jaws shown, on the left, in their engaging position and, on the right, in their position disengaged from the upper end-piece.

The centering member B, shown in section in FIG. 6, has at its upper part a shape similar to that of the upper end-piece 14, which allows it to be gripped by means of clamp 58 which also serves to manipulate the fuel assemblies. The centering member B is capable of being placed on the upper end-piece and being connected and disconnected thereto. It may be regarded as comprising a casing 44 provided with a flange and a plate 45 connected to the flange by screws 46. On the plate 45 are fixed two pins 47 extending downwardly, intended to engage in the end-piece 14 (in thin lines in FIG. 6) to ensure centering. The means for joining together the member B and the end-piece comprises eight retractable claws 43 having an arrangement similar to that of the claws of the clamp 58. These claws are controlled by a cam 48 displaceable along the axis of member B by a threaded connection. This connection comprises a nut 49 connected to the cam and a freely rotatable screw 50, which is prevented from movement in translation, to be driven by a locking tool 59, shown in FIGS. 10 and 11. This tool is a simple tube key of shape corresponding to that of a square head 61 at the end of screw 50 (FIGS. 6, 10 and 11).

The centering member B further comprises tubular centering cylinders 52 intended to allow passage of different tools for operation on the connectors. These cylinders are held between the casing 44 and the plate 45 and constitute spacers for fixing or separation. The cylinders 52, twenty-four in number in the embodiment described, are arranged to be aligned with the connectors 53 for fixing the tie member 15, and formed by guide tubes for central rods in the embodiment shown. Each of the centering cylinders 52 has two diametrically opposed grooves 54 of bayonet shape, intended to receive lugs provided on tool H, thus allowing fixing of the orientation of this tool and its longitudinal position corresponding to an axial abutment.

Assembly C (FIGS. 4 and 5) comprises a frame 60 connected to a cylinder-carrying plate 64 by columns 62 and screws 63. The cylinder-carrying plate 64, of hollow shape to allow passage of member B, is fixed to this member by screws. The height of frame 60 relative to the fuel assembly to be maintained is fixed at the appropriate value by the pins 47 for centering the member (FIG. 6) because of the connection of the frame and the member. The frame allows limitation of the extent of rotation of the upper end-piece 14 during screwing and unscrewing of the connectors 53 connecting the guide tubes forming the tie members and the end-piece 14. It comprises for this purpose a square opening allowing passage of the end-piece with a small amount of play.

The cylinder-carrying plate 64 is intended for storing new or used elements during operations on the fuel assembly. The plate shown partially in FIGS. 4 and 5 comprises forty-eight rings 66 for receiving connectors (twenty-four new connectors and twenty-four irradiated connectors). The supports 68 fixed to the plate 64 carry guiding cylinders 70 facing the rings and intended to guide the tools for handling the connectors 53. Other rings, twenty-four in number in the embodiment described, are intended to receive centering cones for the guide tubes.

The cylinder-carrying plate 64 is provided with two columns 73 provided with a conical nose intended to facilitate introduction of a grasping tool which engages the columns at the height of grooves 74 which are provided, as described below. To ensure guiding and precise transverse positioning of the assembly formed by the centering member B, the frame 60 and the cylinder-carrying plate 64 on the head plate A, the plate 64 is provided with sleeves 76 sliding on columns 39.

The tool D intended to manipulate the assembly formed by the centering member B, the frame 60 and the cylinder-carrying plate 64, shown in FIGS. 7 and 8, comprises a pole composed of two coaxial tubes 80 and 82 capable of rotation with respect to each other between an engaging position and a locking position (FIG. 8). At the lower end of external tube 80 is fixed, for example by welding, a plate 84 provided with two vertical cylindrical guides 86 intended to cover the handling columns 73 (FIGS. 5, 8 and 9). In each guide 86 there is provided a horizontal opening, on close to three quarters of the periphery of the guide, at the level of the horizontal groove 74 in the handling column 73.

At the lower end of internal tube 82 is fixed, for example by welding, a paddle 90. When the lower tube 82 is in the locking position (in broken lines in FIG. 8), two notches provided in the paddle 90 are engaged, through the openings 88 in the guides, in the horizontal grooves of columns 73 and thus connect the tool D to the assembly to be manipulated. When, on the other hand, the interior tube is in the position shown in solid lines in FIG. 8, the paddle 90 frees the handling columns 73 and allows engagement, and then disengagement, of the tool once the centering member B has been brought on to the end-piece as shown in FIG. 9.

In the case shown in FIG. 7, rotation of the tubes 80 and 82 relative to each other is obtained by operation of two handles 92 placed at the top of the pole.

Given that the operations carried out on a fuel assembly 10 take place under a great depth of water, it is difficult to check visually, even if a television camera is immersed near the upper end-piece 14, whether the latter is correctly engaged on the ends of guide tubes 15.

The tool G shown in FIGS. 12 to 14 is intended to allow this verification from the service platform placed above the tank. The tool G is formed of an external tube 94 of which the end part is provided to cover one of the pins 39. This external tube 94 contains a sliding interior tube 96 which acts as a feeler and allows measurement of the difference in height between the end of the pin and the end of the exterior tube resting on the member the height of which is to be checked, formed by one of the sleeves 74 (FIG. 14). A direct indication of the difference in height is provided by an engraved scale on the interior tube which is visible through a window 98 in the exterior tube 94 (FIG. 12). A key sliding between the tubes, formed by a screw 100 and a groove 102 (FIG. 13) prevents relative rotation of the two tubes. A solid plug 104 placed in the lower part of the interior tube ensures biological protection of the operator. Tool G, like tool 59 and the majority of those described below, comprises a ring allowing the ring to be suspended from a movable bridge for handling.

To facilitate remounting in place of the end-piece 14 after replacement of the fuel rods, means are provided for replacing the connectors 53 with centering cones 106 corresponding to the removed connectors, before withdrawal of the end-piece 14. The guide tubes 15 are thus caused to be replaced correctly in the housings of the end-piece during remounting. The positioning and removal of cones 106, may be carried out using tool E shown in FIGS. 15 to 17. This tool comprises an exterior tube 108 provided at its lower part with a conical housing 109 of shape corresponding to that of the centering cones 106, formed by stems having conical ends and a threaded middle part. This exterior tube is rigidly connected in rotation with the cone engaging it by insertion of two projections 110 in grooves 111 in the cones (FIG. 16). In the exterior tube 108 there may rotate a central stem 112, manoeuvrable by means of a knurled button 114, of which the threaded end may be screwed to the cones.

Removal of the connectors 53 of the fuel assembly to be maintained and mounting in place of new connectors requires, when these connectors are locked in place after screwing tight, two distinct tools F and H shown respectively in FIGS. 18–21 and FIGS. 22–23.

The two tools are intended to be used on fuel assemblies comprising connectors 53 which, when the fuel assembly is ready for use, are mounted on the end-piece. Tool F is provided to dismount the connectors and unscrew them, then transfer them, and then put in place the new connectors which are then mounted by means of tool H.

Tool F comprises a member of which the end part is intended to come into engagement with the connector. This end part comprises a cone 116 for centering in the guide tube 15, and a portion having a star portion 118 intended to enter four openings separated by 90° in the mounted connectors (FIG. 24). This portion is traversed by a removable finger 120 for holding the connectors during their transfer. In the member is placed a rotatable stem 122 (FIG. 21) to which is fixed a knurled disc 124 (FIG. 18). A second disc 126, keyed to slide on the stem, is urged by a spring 128 towards a hexagonal nut 130 integral with the member which it allows to be driven in rotation. The disc 126 is provided with a lug 132 which co-operates with the hexagonal nut 130 so as to lock the stem in two corresponding annular positions, one for retraction of the lug 120 and the other for extending this lug out of the lower part of the tool.

The mounting tool H shown in FIGS. 22 and 23 is intended to press back a thin wall of the cylindrical head of the new connectors (FIG. 24) in housings provided for this purpose in the upper end-piece 14. It comprises for this purpose an exterior tube 134 of which the lower part comprises lugs 135 intended to be housed in the bayonet grooves 54 in the centering cylinders 52 (FIG. 6). In the tube 134 is mounted a stem 136 in two parts. The lower part of the stem carries a mandrel 138 for mounting the connectors, giving them the shape shown on the right in FIG. 24. It is connected in rotation to exterior tube 134 in which it can slide axially over a length defined by a sliding key (not shown). The upper part of the stem is in axial contact against the lower part. It is connected to the exterior tube a screw-nut connection which allows, on turning by means of a square head 140, application to the lower part of an axial force deforming the connector. This force may be regulated by operating the square head 140 with a dynamometric key.

The apparatus further comprises a tool J intended for operation on the fuel assembly when the upper end-piece has been dismounted by using the means described above. This tool J allows extraction of defective fuel rods, removal of them and mounting in place of a replacement element formed by a new rod or an element having the same external shape.

Tool J, shown in FIGS. 25 to 35, may be regarded as formed of two vertical poles 142 and 144 and a centering frame, movable en bloc.

The pole 142 comprises the principal member containing the gripping means. The auxiliary pole 144 (FIGS. 31–35) serves to displace, in plan, the gripping tool with respect to the frame 145 once the latter is engaged in the base plate A (FIG. 35) and to bring the gripping clamp exactly facing the emplacement of a fuel assembly where a rod is to be removed or deposited.

Each pole is formed by a lower part 146 and an upper part 148. The two upper parts, on the one hand, and the two lower parts on the other hand, are connected so as to form an assembly of length which is less than that of the tool, manipulable en bloc. Transport of the tool is thus facilitated. Each upper part is fixed to the corresponding lower part by dismountable means, such as screws for the pole 142.

In the pole 142, the lower part 146 contains and guides the clamp for gripping the rod and protects the latter when it is removed during vertical and horizontal displacement of the tool J. The upper part 148 contains control members, connected to movable members of the lower part 146 by means which are also dismountable, which will not be described as they may be of any known type.

The lower part 146 of the pole 142 comprises an external jacket 149 which constitutes a structural member. In this jacket 149 is placed a sheath 150, surrounded by a tube 151 intended to increase the rigidity of part 146. The sheath 150 and the tube 151 remain static during mounting and dismounting of a rod in the fuel assembly 10. In the sheath 150 are arranged concentrically a composite tube 152 for closing a gripping clamp 154 and a feeler 156. All these elements are connectable to corresponding control members situated in the upper part 148 by means contained in the zone shown from the outside in FIG. 31.

Figure 5A:
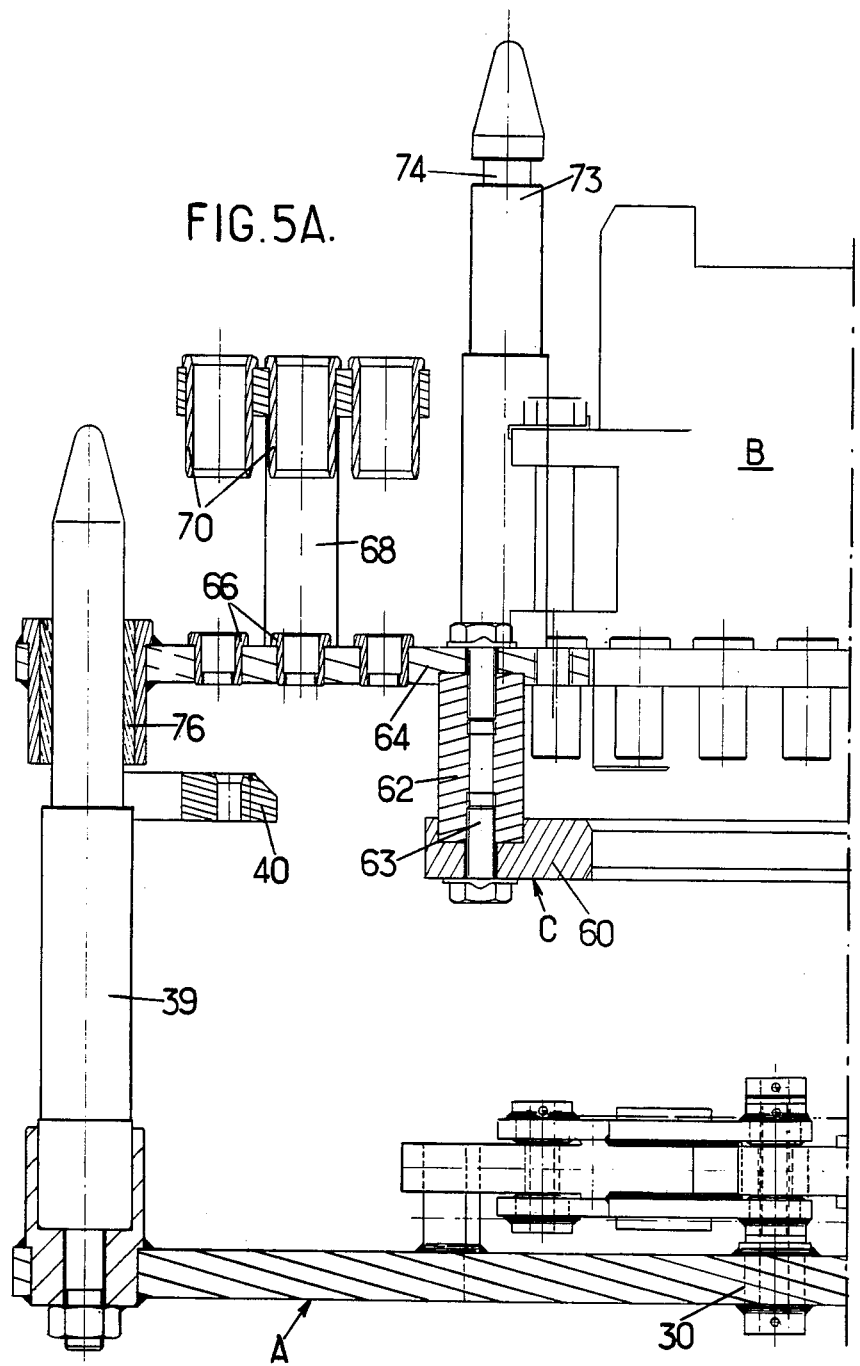

The lower part of the jacket 149 is fixed to a carriage 166 for approximate alignment of the sheath 150 with the mounting of the appropriate rod, a carriage capable of horizontal translation on the frame 145. This frame 145 (FIGS. 31-33 and 35) comprises two parallel horizontal rails 162 connected by cross-members. It is provided with centering pins 163 (FIG. 33) intended to engage in holes in members 40 of the base-plate A (FIGS. 5A, 5B). The rails 162 have a notched circular section. They guide and confine four wheels 164 having vertical axes, carried by the carriage 166 which comprises two rings 158 and 160, intended respectively to hold with respect to axial translation the poles 142 and 144. One of the rails 162 is provided with a rack 168 serving for approximate positioning of the sheath, as described below.

The sheath 150 (FIGS. 26–31) is of tubular shape and sufficiently small thickness to be slightly flexible in its free part, between an upper flange 170 for connection to the upper part 148 and a lower connector 172 which rotates freely on the sheath and in the ring 158, a connector which also retains the tube 151 with respect to translation. The connector 172 is eccentrically mounted to allow precise centering of the sheath, as described below.

The composite tube 152 is in several pieces held together. Its diameter is less at its lower part than at its upper part so that it can be placed in the vertical line of rod 11 to extract it without being obstructed by the guide tubes 15 and the centering cones 106 put in position during dismounting of the upper end-piece. The tube 152 is free to slide inside the sheath 150 over the length necessary for the rod extracted to be completely protected by the sheath 150: this length frequently exceeds 4 m in apparatus intended for currently used fuel assemblies.

Figure 29:
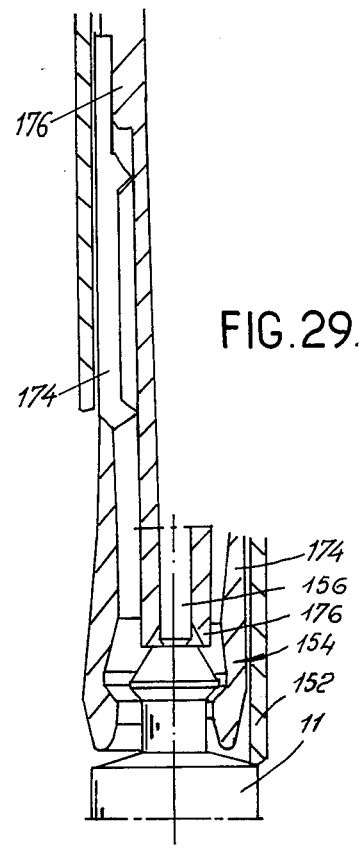
FIG. 29 is a detail on a larger scale showing, on the left, the clamp open and, on the right, the clamp closed on the end cap of a fuel rod.
Figure 28:
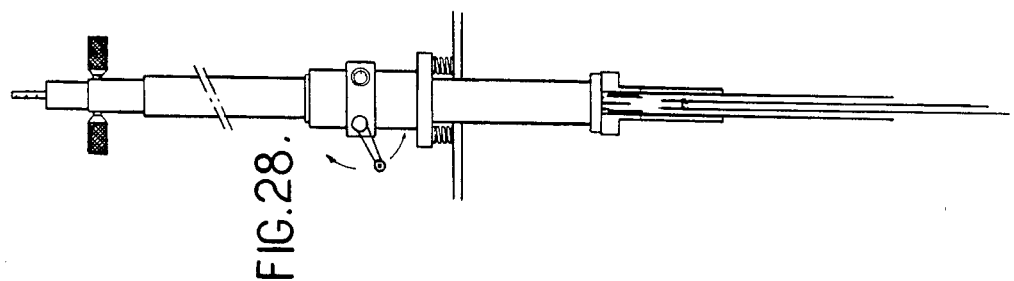
FIGS. 26, 27 and 28 are schematic diagrams, in elevation, showing respectively, the extraction tool in the position of FIG. 25, after descent and closure of the clamp, and after remounting of a rod.
Figure 27:
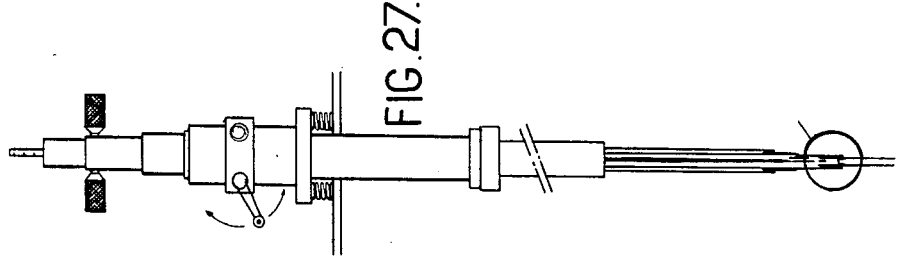
Figure 26:
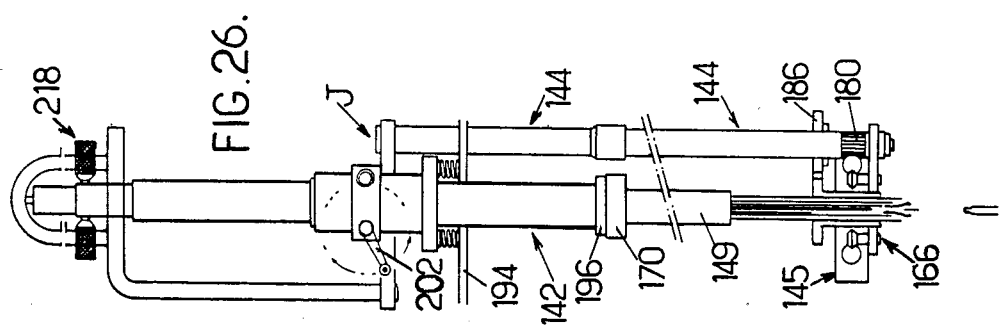
Figure 34:
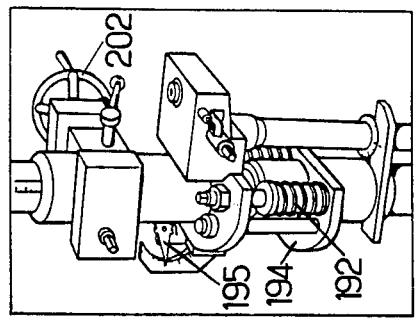

The complete tube 152 has the function of closing the clamp 154 for gripping the rod and transmitting force for insertion of the rod by exercising a vertical force on a shoulder formed on the cap, as shown in FIG. 29.

The upper part of the composite tube is provided with a flange (not shown in the Figures) for connection to the corresponding element of the upper part.

The clamp 154 (FIG. 29) is provided to be in an open position during approach to the rod and be closed by axial displacement of the composite tube 152, after the feeler 156 has come into contact. It is formed by elastic fingers of a member 174, generally of stainless steel, screwed on a tubular end-piece 176 which also guides the feeler 156. This end-piece 176 is connected to the upper part by sliding means (not shown in the drawings).

The feeler 156, displaceable along the axis of the pole 142, is intended to verify that the head of the rod 11 is properly positioned relative to the clamp 154 before closure of the latter. In its rest position (FIG. 26) this feeler passes beyond the lower level of the clamp 154 by a predetermined distance, for example 10 mm. Its lower part is formed by a stainless steel stem of small diameter. It is connected to a corresponding element in the upper part 148 by a tube terminated by a threaded socket (not shown in the drawings).

Figure 31:
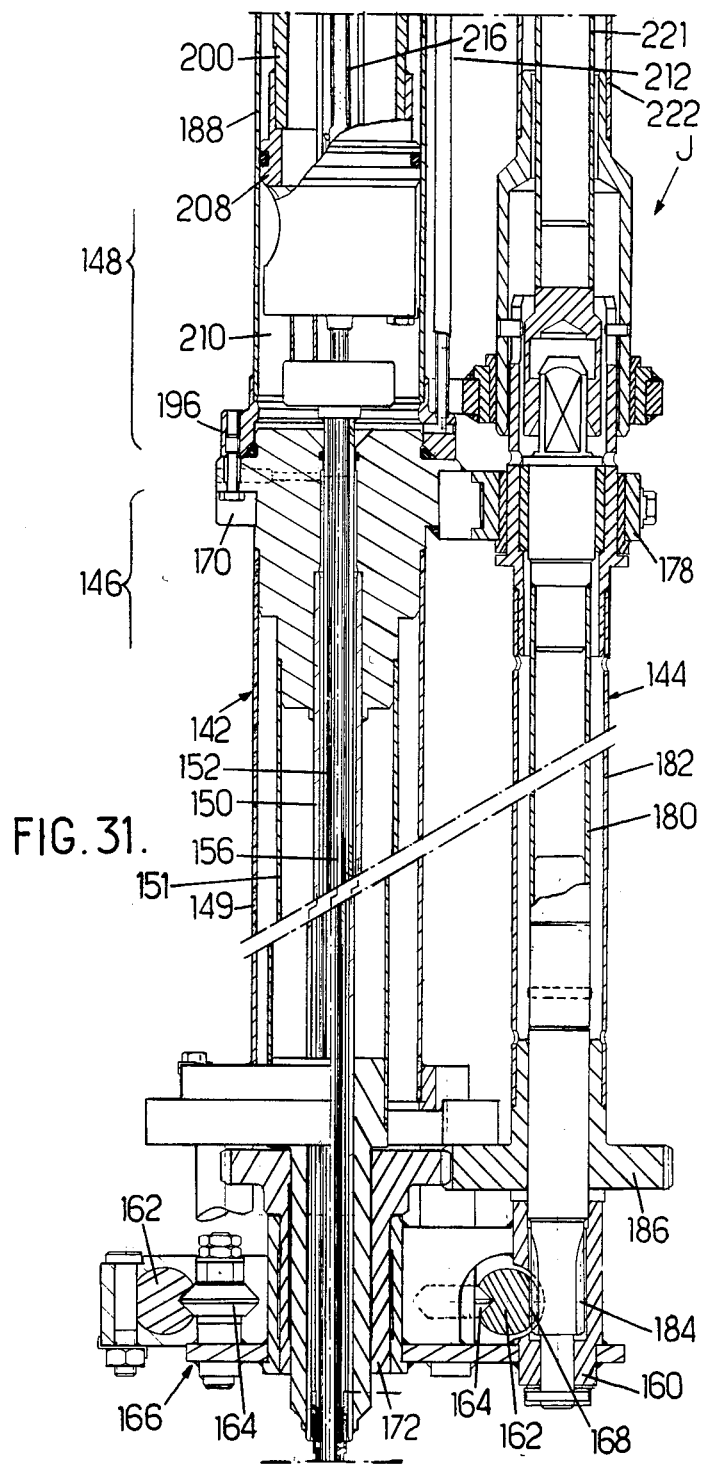

The lower part of the auxiliary pole 144 is held with respect to translation at each of its ends relative to the jacket 149 of the principal member by the ring 160 and by a collar 178 (FIG. 31). It is formed of two co-axial tubes 180 and 182, free for rotation relative to each other, but held with regard to axial translation. The lower end of interior tube 180 carries a set of teeth 184 which mesh with the rack 168 carried by one of the rails. Consequently it is possible, by rotation of tube 180, to move the pins 163, connected to the rails 162, with respect to the lower end of the sheath 150, and thus to carry out an approximate adjustment.

The exterior tube 182 is intended for fine adjustment of the lower end of sheath 150. For this purpose it carries a toothed crown 186 for driving the eccentric connector 172 about the axis of the clamp. The eccentricity, for example 2.5 mm, allows fine adjustment in plan of the position of the sheath.

The upper part of the pole 142 (FIGS. 30 and 31) comprises an exterior jacket 188 extended upwardly by the sleeve 190 and which surrounds the control mechanisms. The assembly thus formed rests, by means of springs 192, on a centering bearing 194 connected to hook means on the movable bridge. A device 195 for measuring relative displacement of the bearing 194 and the sleeve (190) (FIG. 34) indicates the force of traction or pressure exerted on the rod during extraction or introduction.

The lower part of the jacket 188 is provided with a flange 196 (FIG. 31) for connection to the terminal flange 170 of the jacket 149 of the lower part. A smooth bearing 198 fixed in the upper part of the jacket 188 guides a tube 200 fixed to the composite tube 152.

The tubes 200 and 152 are displaceable vertically en bloc, by means of a mechanism placed in the upper part of the pole 142. In the embodiment illustrated in FIG. 34, this mechanism is controlled manually. It comprises a wheel 202 connected by a shaft to a pinion 204 engaging a rack 206 connected to the tube 200. The assembly, movable vertically, may be balanced by pneumatic pressure. For this, the lower part of tube 200 forms a piston 208 defining, with the jacket 188, a compartment 210 into which a duct 212 may feed gas under regulated pressure. The assembly also comprises accompanying elements for immobilising the tube 200 in any of its positions (not shown), which are generally completed by a ratchet device on the pinion 204 or a pinion forming part of a symmetrical assembly arranged on the other side of tube 200 to balance lateral forces. This ratchet device allows descent of the vertically movable assembly only on operation by an operator.

Figure 32:
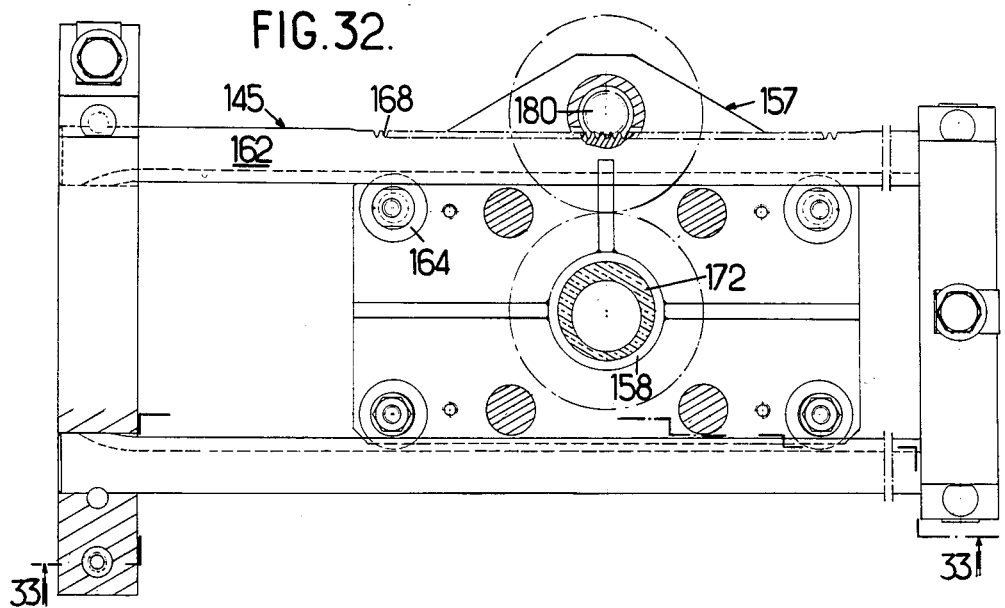
FIG. 32 is a section along line 32—32 of FIG. 31.
Figure 33:
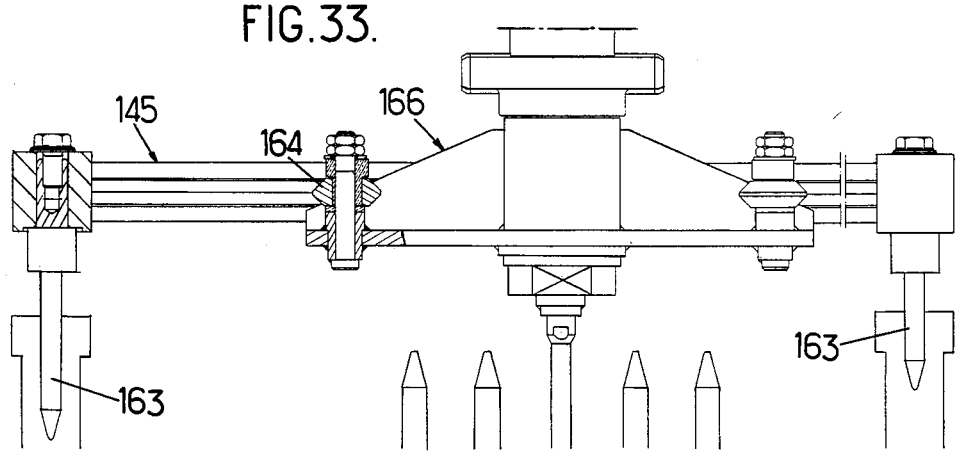
FIG. 33 is a section along line 33—33 of FIG. 32.

The upper part of the pole 142 further contains a tube 216 intended to transmit the locking action of the clamp 154 and the push member for mounting a rod 11 in place in the fuel assembly 10. The tube 216 may be immobilised, relative to the tube 200 which carries the rack 206, by a locking device 218 having two positions (clamp open, clamp closed). The lower part of this tube 216 carries a flange for connection with the composite tube 152. The weight of this assembly is balanced by a spring 220 in contact with the rack-carrying assembly and on which rests an adjustable nut on a threaded stem 224 fixed to the tube 216. (FIG. 32).

The uppe part 146 is provided with means for indicating the position of feeler 156 relative to the clamp and, therefore, the position of the clamp relative to the rod on engagement with the latter. These means may be formed by an engraved scale on the tube 200 and thus a fraction which varies according to the position of the feeler appears above the bearing 198.

Figure 30A:
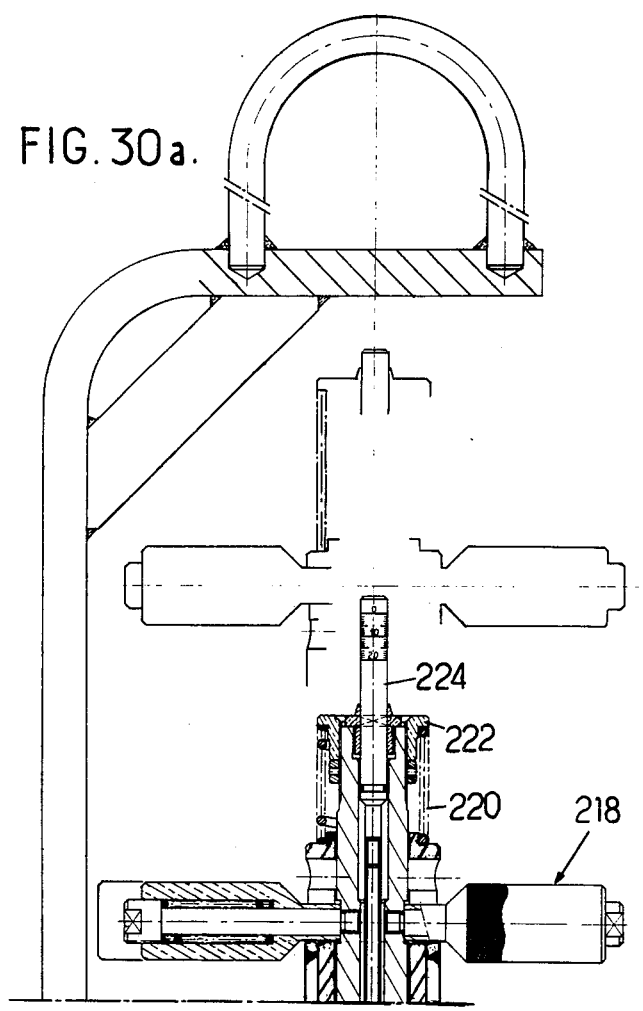
FIGS. 30A, 30B and 31 are partial views of the upper part and the lower part of the extraction tool in section along the same vertical plane.
Figure 30B:
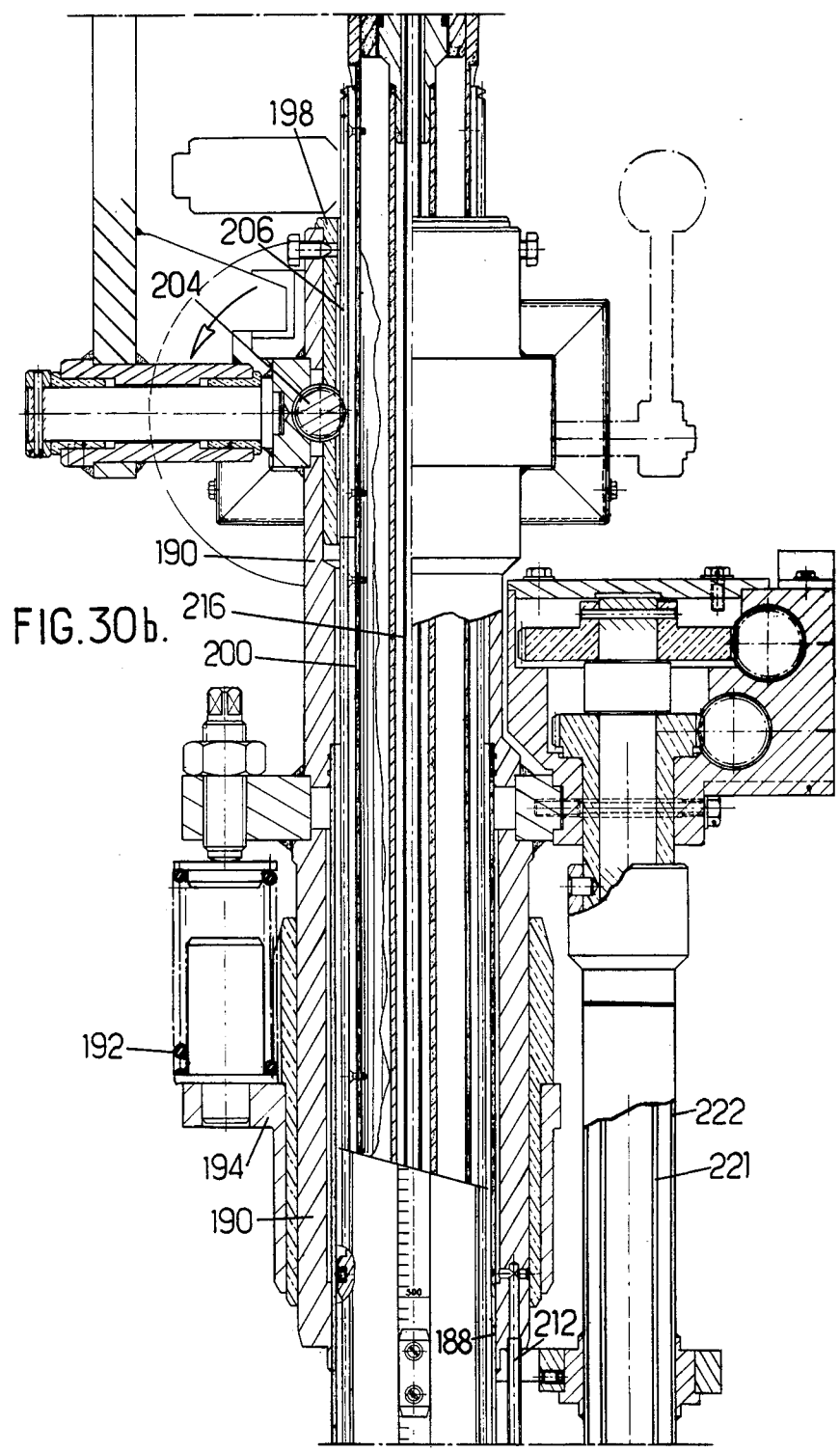

The upper part of the auxiliary pole 144 (FIG. 30A) is formed by two rotatable tubes 221 and 222 which are connected to tubes 180 and 182 of the lower part by means for driving in rotation which are disengaged when part 144 is raised. The tubes 221 and 222 are both provided at their upper end with a rotary driving mechanism formed of a tangent wheel attached to the tube and an endless screw which is operated manually (FIG. 30). By rotation of tubes 221 and 222 it is possible to carry out successively approximate and fine adjustment in plan of the position of the sheath.

The sequence of operations for maintenance of a fuel assembly 10, by removal of a defective rod and insertion of a replacement element, may be as follows in the apparatus which has been described.

The fuel assembly 10 to be maintained is first deposited, by means of a known type of tool for handling fuel, in the maintenance cell 21 attached to a support in a tank, in the pit for removal of exhausted fuel (FIG. 2). The cell is then raised to an upper position, shown in broken lines in FIG. 2. The tightening means with which the base plate A is equipped (FIGS. 4 and 5) are actuated to immobilise the fuel assembly 10 in the cell. Then, the centering member B and the frame C are brought to the upper end-piece 14 by means of tool D. The centering member is then locked onto the upper end-piece by engagement of jaws 43 by means of tool 59 (FIGS. 10 and 11). The height of the upper end-piece 14 is adjusted by means of gauge tool G (FIGS. 12–14). Each connector 53 for fixing the end-piece on the guide tubes is removed in turn by means of tool F. For this, tool F is inserted at the bottom in the connector to be removed, lug 120 retracted. The star 118 then engages in the zones provided for this in the thin part of the connector. By turning the tool, the connector is unscrewed and disengages from its tie member 15. By rotating through a half-turn the ring 126, the lug 120 is caused to extend under the connector and allow the latter to be lifted. The twenty-four irradiated connectors thus extracted are deposited in the rings 66 of the cylinder-carrying plate 64, already provided with twenty-four new connectors. By means of tool E (FIGS. 15–17), the centering cones 106 are mounted on the tie members 15. It is then possible, by means of handling tool D, to remove the centering member B and the end-piece 14 to a storage stand.

Figure 35:
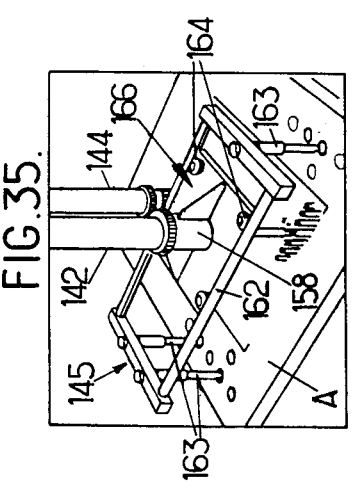

Raising the upper end-piece allows access to the defective rods 11. The cell 21 is first of all lowered to the position shown in solid lines in FIG. 2. The tool J is brought above the cell, then lowered so as to engage the centering pins 163 of the frame in the appropriate holes of the members 40 of the base plate (FIG. 35). The lower end of the sheath 150 and of the clamp is then moved horizontally until it is exactly in line with the rod to be removed, by the action of the tubes of the auxiliary pole 144. The clamp 154 is lowered onto the rod (FIG. 29), its arrival in the engagement position being indicated by the feeler 156. The clamp 154 is then closed by descent of the composite tube 152, then the clamp 154, tube 152 and the rod 11 are lifted until the rod is completely contained in the sheath 150 which surrounds it. The rod is then completely disengaged from the cell and may be transported to a storage container. The replacement element is then brought and inserted by the reverse procedure.

Once the defective elements have been replaced, the upper end-piece has to be re-mounted in place. To achieve this, the cell is again raised to the position shown in broken lines in FIG. 2. The end-piece 14 with its centering member B is placed in position. Insertion of the end-piece 14 is facilitated by the centering cones 106 screwed in, in place of the connectors 53. The position of the end-piece is checked using the gauge tool G. The tightening means for the first grid in the base plate A are slackened by means of tool 59 engaging the square end 36. The twenty-four centering cones are unscrewed, then lifted, using tool E. The twenty-four connectors 53 are mounted in place and screwed in using tool F then deformed using tool H. The jaws of the centering member B are disengaged from the end-piece using tool 59. The repaired fuel assembly may then be removed. To achieve this, the cell 21 containing it is lowered and the fuel assembly 10 is taken up using a fuel handling tool carried by the catwalk over the tank.

We claim:

1. Apparatus for maintainance and repair of a nuclear fuel assembly of the type comprising: a skeleton having an upper end piece, a lower end piece and tie members connecting said end pieces and removably fixed to at least said upper end piece; and a bundle of fuel rods retained between said end pieces, said apparatus comprising:
   (a) a cell vertically displaceable in a water tank and provided at the upper part thereof with a base plate having an opening for passage of one said fuel assembly and clamping means operable for clamping said nuclear fuel assembly below said upper end piece and releasing said nuclear fuel assembly,
   (b) a centering assembly constructed for insertion to and removal from a location over the upper end piece of the fuel assembly and provided with locking means for releasable connection of said centering assembly and said upper end piece and with guiding passages;
   (c) remote handling tool means for moving said centering assembly to and from said location over said upper end piece and for operating said locking means;
   (d) and additional tools means insertable along said guiding passages for disconnecting the tie members from the upper end piece;
   (e) an insertable unit arranged for slidable insertion over and around said upper end piece and provided with indexing means co-operating with associated indexing means on the base plate for preventing rotation of said insertable unit and upper end piece;
   (f) and a grasping tool for handling said centering assembly and said insertable unit, having: a handling pole; downwardly directed vertical guide cylinders fast with said pole and arranged to engage over said centering means; and an internal tube mounted for rotation within said pole and provided at the lower end thereof with a rotatable plate provided with means for engaging with co-operating means in said columns for connection of the tool and insertable unit.

2. Apparatus for maintainance and repair of a nuclear fuel assembly of the type comprising: a skeleton having an upper end piece, a lower end piece and tie members connecting said end pieces and each removably fixed to at least said upper end piece by a connector; and a bundle of fuel rods retained between said end pieces, said apparatus comprising:
   (a) a cell located in a water tank and provided at the upper part thereof with a base plate having an opening for passage of one said fuel assembly and clamping means operable for clamping and releasing an upper part of said bundle of fuel rods;
   (b) a centering assembly constructed for location over the upper end piece of the fuel assembly and provided with locking means for releasable connection of said centering assembly and said upper end piece and with guiding passages;
   (c) remote handling tool means for moving said centering assembly to and from said location over said upper end piece and for operating said locking means;
   (d) additional tool means insertable along said guiding passages for separate removal of each said connectors;
   (e) a plurality of conical centering inserts each insertable into the upper end of said tie members in replacement of one of said connectors, each of said inserts having a stem with conical ends and a threaded intermediate portion;
   (f) and a tool for insertion and removal of said inserts into and out of upper ends of said tie members, having: an outer tube formed at the lower end thereof with a connector housing of a shape corresponding to that of the conical ends of said inserts and provided with means for non-rotatable connection with said conical end; and a central rotatable rod having an internally threaded end portion for threaded connection with the intermediate portion of said cones.

3. Apparatus for maintainance and repair of a nuclear fuel assembly of the type comprising: a skeleton having an upper end piece, a lower end piece and tie members connecting said end pieces and removably fixed to at least said upper end piece; and a bundle of fuel rods retained between said end pieces, said apparatus comprising:
   (a) a cell located in a water tank and provided at the upper part thereof with a base plate having an opening for passage of one said fuel assembly and clamping means, operable for clamping and releasing an upper part of said bundle of fuel rods;
   (b) a centering assembly for location over the upper end piece of the fuel assembly, provided with locking means for releasable connection of said centering assembly and said upper end piece and with guiding passages and with slidable guide means engageable with co-operating means on said base for mutual alignment of said centering assembly and said base plate upon insertion of said centering into said location;
   (c) remote handling tool means for moving said centering assembly to and from said location over said upper end piece and for operating said locking means;
   (d) and additional tool means insertable along said guiding passages for disconnecting the tie members from the upper end piece.

4. Apparatus according to claim 1, wherein said pole comprises a feeler displaceable along the axis of the pole between a rest position in which it extends beyond the lower level of the clamp by a predetermined length and an upper position in which it is pressed back by a rod when the clamp is engaged with the rod, said feeler being connected to an indicating means at the upper part of the pole.

5. Apparatus according to claim 1, wherein the lower part of the clamp comprises a composite tube displaceable relative to the clamp between an upper position when the clamp is open and a lower position where the clamp is closed on the rod and in axial contact with the rod.

6. Apparatus according to claim 5, further comprising means positioned on the pole for lowering together the clamp and the composite tube feeler between a lower position where the clamp engages a rod in the cell and an upper position where the clamp holds the whole of the rod in a protective jacket connected to the pole.

7. Apparatus according to claim 3, further comprising a fuel handling tool for handling one of said fuel rods at a time, said rod comprising: at least one pole provided with means for horizontally displacing said pole while the latter is is upright position within the tank into and out of vertical alignment with said cell; a fuel rod clamp displaceable vertically within and long said pole; and means for horizontal centering of the clamp on one of said fuel rods.

8. Apparatus according to claim 7, wherein said horizontal centering means comprises: a frame engageable vertically on alignment means fast with said base plate; and a carriage fixed to a lower plate of said pole and horizontally movable on said frame.

9. Apparatus according to claim 8, wherein said alignment means comprises a plurality of vertical holes formed in said base plate and downwardly directed centering pins of said frame arranged for engagement into said holes.

10. Apparatus according to claim 8, wherein said alignment means further comprise a sheath slidably receiving said clamp for vertical guidance thereof, a sleeve mounted for rotation about said sheath and excentrically located with respect to said sheath, a ring fast with said carriage and rotatably receiving said sleeve, and means for rotating said sleeve within said ring.

11. Apparatus according to claim 8, wherein said fuel handling tool comprises a second pole parallel to said first pole, means carried by a lower part of said second pole for horizontally moving the carriage on said frame, drive means carried by an upper part of said second pole, and mechanical means drivably connecting said means for driving the carriage and said drive means.

12. Apparatus according to claim 3, wherein said clamping means comprise movable jaws and cam means movable along the axis of said centering assembly by threaded means for displacing said jaws between a position in which they co-operate to clamp said bundle and a spaced apart position, and tool means insertable into said threaded means from above for operating said threaded means.

13. Apparatus according to claim 3, wherein said guiding passages in said centering assembly are formed in centering tubes for passage of said additional tool means for processing mechanical connectors joining said end piece and said tie members.

14. Apparatus according to claim 12, further comprising:
(e) an insertable unit arranged for vertical insertion into said upper end piece and provided with indexing means co-operating with associated indexing means on the base plate for preventing rotation of said insertable unit and upper end piece with respect to said base plate.

15. Apparatus according to claim 14, wherein said insertable unit includes means for temporarily storing a plurality of said connectors and guiding means for guiding the tools in alignment with said connectors.

16. Apparatus according to claim 14, wherein said insertable assembly is provided with means cooperating with a grasping tool for manipulation as a whole of said insertable assembly and said centering memeber, columns provided with a nose for introducing the grasping tool and with peripheral grooves.

* * * * *